United States Patent Office 2,843,519

Patented July 15, 1958

1

2,843,519

PESTICIDAL COMPOSITIONS COMPRISING DIMETHYL CARBAMATES OF DIMETHYL AMINO AND HETERO-SUBSTITUTED METHYL PHENOLS AND METHOD OF USING SAME

Howard M. Fitch, New York, N. Y.

No Drawing. Application November 18, 1952
Serial No. 321,279

16 Claims. (Cl. 167—30)

This invention relates to toxicant compositions particularly useful against aphids and mites and to method of combatting aphids and mites.

It has been found that compositions containing relatively small proportions of lower dialkylcarbamates of dialkylaminomethylphenols and their piperidino, morpholino and pyrrolidino analogues, either as the free bases or as wholly or partially neutralized salts, are highly effective in combatting infestations of aphids and mites, particularly on plants and plant materials such as cut flowers, plant cuttings and the like.

The toxicants of the invention may be represented by the general formula $$(R)_2NOCO—A—CH_2Y$$

wherein R is a lower alkyl group, A is phenyl, lower alkyl phenyl, nitrophenyl or chlorophenyl, and Y is lower dialkylamino, N-piperidino, N-morpholino and N-pyrrolidino, and the acid salts thereof.

The toxicants of the invention may be prepared by reacting a dialkyl carbamyl halide with a dialkylaminomethylphenol. The presence of an acid-acceptor facilitates the reaction, and tertiary amines such as triethylamine and pyridine are suitable acid-acceptors. The compounds may also be prepared by reacting a dialkyl carbamyl halide with an alkali metal salt of a dialkylaminomethylphenol. In this case the alkali metal acts as an acid-acceptor. Inert solvents or diluents such as benzene or toluene may be used, or an excess of the acid-acceptor may be used as a solvent.

The dialkylaminomethylphenols may be prepared by conventional methods, and dialkylaminomethylphenols prepared by the Mannich reaction, which comprises reacting a dialkylamine with formaldehyde and a phenol, are preferred due to their low cost and ease of preparation. The dialkylaminomethylphenols employed in the examples were prepared by the Mannich reaction with the exception of 4-dimethylaminomethylphenol, which was prepared by the method of Stedman, J. Chem. Soc. 1927, 1902.

As an example, 20.73 g. 4-dimethylaminomethyl-2-methyl-5-isopropylphenol (0.10 mole) and 11.29 g. dimethylcarbamyl chloride (0.105 mole) in 50 cc. anhydrous pyridine are heated under reflux protected from moisture at a bath temperature of about 135° C. for 7 hours. Most of the excess pyridine is distilled off under reduced pressure to 130° C./30 mm. Excess concentrated ammonium hydroxide is added to a solution of the residue in water, and the mixture is extracted with ether. The ether layer is washed with 2 N sodium hydroxide solution and with water, and dried over calcium sulfate. Distillation of the ether on a steam bath to 100°C./10 mm. leaves 19.58 g. of the dimethylcarbamate of 4-dimethylaminomethyl-2-methyl-5-isopropylphenol (70% theory). The acid oxalate is prepared by adding excess oxalic acid to the base in absolute alcohol and is purified by crystallization from absolute and from 98% alcohol. The pure base is obtained by treating a solution of the purified oxalate with sodium carbonate. Other dialkylcarbamates of dialkylaminomethylphenols and their salts may be prepared in a similar manner or by reacting a dialkylcarbamylchloride with an aqueous solution of an alkali metal salt of a dialkylaminomethylphenol as described subsequently, and their properties are listed in Table I.

TABLE I

*Dialkylcarbamates of dialkylaminomethylphenols and their salts*

| No. | Dimethylcarbamate of— | Melting Point | Boiling Point | Refractive Index $n_D^{25}$ |
|---|---|---|---|---|
| 1 | 2-dimethylaminomethyl-phenol | | 99–100° C./0.5 mm | 1.5118. |
| 1A | Neutral oxalate salt of 1 | 133.5–4° C | | |
| 2 | 4-dimethylaminomethyl-phenol | | 112–4° C./0.5 mm | 1.5132. |
| 2A | Hydrochloride salt of 2 | 218–9° C | | |
| 3 | 4-dimethylaminomethyl-2-methyl-5-isopropyl-phenol. | | 135–6° C./1 mm | 1.5092. |
| 3A | Acid oxalate salt of 3 | 201–2.5° C., gas evol | | |
| 4 | 4-piperidinomethyl-2-methyl-5-isopropyl-phenol. | 61.5–3° C | 160–3° C./0.5 mm | 1.5216 (supercooled). |
| 4A | Acid oxalate salt of 4 | 190–2° C., gas evol | | |
| 5 | 4-piperidinomethyl-3,6-dimethylphenol. | 69.5–70.5° C | | |
| 5A | Acid oxalate salt of 5 | 175–6° C., gas evol | | |
| 6 | 4-piperidinomethyl-3-methyl-6-isopropyl-phenol. | | 160–2° C./0.3 mm | 1.5187. |
| 6A | Acid oxalate salt of 6 | 185.5–7° C., gas evol | | |
| 7 | 4-piperidinomethyl-3-methyl-6-tert.-butylphenol. | 79.5–80.5° C | 169–71° C./0.5 mm | |
| 7A | Acid oxalate salt of 7 | 190–2° C., gas evol | | |
| 8 | 2-dimethylaminomethyl-4-tert.-butylphenol. | 75–6° C | 129–31° C./0.8 mm | 1.5048 (supercooled). |
| 8A | Acid oxalate salt of 8 | 172.5–3° C | | |
| 9 | 2-dimethylaminomethyl-4-(α,α,γ,γ-tetra-methylbutyl) phenol. | | 148–52° C./0.5 mm | 1.5029. |
| 9A | Acid oxalate salt of 9 | 189–90° C | | |
| 10 | 2-dimethylaminomethyl-4-chlorophenol. | | 123–5° C./0.5 mm | 1.5221. |
| 10A | Acid oxalate salt of 10 | 161.5–3° C | | |
| 11 | 2-dimethylaminomethyl-4-methylphenol. | | 108–10° C./0.5 mm | 1.5109. |
| 11A | Acid oxalate salt of 11 | 144–5° C | | |
| 12 | 2-dimethylaminomethyl-4-nitrophenol. | 37–8° C | | |
| 12A | Hydrochloride salt of 12 | 229–31° C., gas evol | | |
| 13 | 4-pyrrolidinomethyl-2-methyl-5-isopropyl-phenol. | | 148–50° C./0.5 mm | 1.5205. |
| 13A | Acid oxalate salt of 13 | 207–9° C., gas evol | | |

In general, the bases are colorless oils or solids, readily soluble in organic solvents, such as benzene, ether and acetone. Compounds 1 and 2 are very soluble in cold water, and have the unusual property of being much less soluble in hot water than in cold, whereas the other bases are relatively insoluble in water. The salts are colorless solids, soluble in water and relatively insoluble in organic solvents.

The compounds are potent aphicides, for example, against pea aphids, at concentrations of 0.3%, and some, such as compounds 1, 2, 3, 4, 6, and 10 and their salts, are effective at concentrations as low as 0.003%. The compounds are also effective against mites, such as red spider mites.

While the physical constants in Table I are of highly purified products, products of lesser purity are also highly effective and will generally be preferred as being more economical. Products prepared by reacting a dialkylcarbamyl halide with an alkali metal salt of a dialkylaminomethylphenol in aqueous solution or suspension are particularly inexpensive and easy to prepare. Examples of reacting dialkylcarbamyl halides with alkali metal salts of such phenols under substantially anhydrous conditions are given in U. S. Patent 1,905,990. As is pointed out in U. S. Patent 2,208,485 to the same inventor, however, the ease of oxidation and hygroscopic nature of the alkali metal salts make this a difficult reaction. It might be expected that oxidation would be even more extensive in an aqueous system and that the bulk of the dialkylcarbamyl halide would react with the water present rather than with the alkali metal salt of the phenol. It has been found that this is not the case with the alkali metal salts of dialkylaminomethylphenols. These salts show little tendency to oxidize in aqueous solution, and they react readily in aqueous solution with dialkylcarbamyl halides to give dialkylcarbamate esters.

In the following example a crude commercial grade of dimethylaminomethylphenol is employed. This material, prepared by reacting phenol with dimethylamine and formaldehyde by the Mannich reaction, is a dark red liquid boiling at about 80–130° C. at 2 mm. pressure. It contains 5–6% phenol, about 20% bis-(dimethylaminomethyl)phenol and 0.5% water. The remainder is a mixture of 2-dimethylaminomethylphenol and 4-dimethylaminomethylphenol. 45.4 g. of this crude dimethylaminomethylphenol (ca. 0.3 mole) is dissolved with cooling in 33 cc. 10 N NaOH solution plus 10 cc. water. To this solution is added 38.7 g. dimethylcarbamyl chloride (0.36 mole) with stirring at 3 to 5° C. during 2 hours, and stirring at 3 to 5° C. is continued for 3 hours longer. The mixture is left in the refrigerator overnight and is stirred at 30 to 35° C. for 2 hours. After adding 50 cc. water and 28.3 cc. concentrated HCl solution (0.34 mole), the mixture is extracted with 75 cc. ether. After neutralizing any excess acid present, the hydrochloric acid solution is suitable for use in pesticidal compositions. In order to isolate the free base, the hydrochloric acid solution is treated with 50 cc. 10 N NaOH solution and with sodium chloride in excess of saturation and is extracted with two 100 cc. portions of ether. The ether extracts are washed with saturated brine, dried over calcium sulfate, and solvent is removed on a steam bath and to 100° C./23 mm. The residue is 41.0 g. yellow liquid having a refractive index, $n_D^{25}$, of 1.5056 and containing 13.5% nitrogen. 10.0 g. of this crude base is treated with hydrochloric acid and diluted with water to a volume of 25.0 cc. to give a hydrochloride solution with a pH of 6.2 equivalent to a 40% solution of the free base.

The aphicidal action of the crude product is the same whether tested as the free base or as the hydrochloride salt and compares favorably with the action of pure dimethylcarbamate of 2-dimethylaminomethylphenol neutral oxalate. A comparison of the aphicidal action of the dimethylcarbamate of 4-dimethylaminomethyl-2-methyl-5-isopropyl-phenol acid oxalate (compound 3A), which has a pH of about 4.4 in dilute solution, after adding sodium carbonate to increase the pH to 8.0 or 8.5 revealed no significant change in activity as a result of the change in pH.

As a further example of a crude product of high aphicidal activity, 64.5 g. dimethylcarbamyl chloride (0.6 mole) is added with stirring to 75.6 g. (ca. 0.5 mole) of the previously described crude commercial grade of dimethylaminomethylphenol. An exothermic reaction occurs, and the rate of addition is controlled to maintain the temperature between 60 and 70° C. The reaction product is then stirred at 95–100° C. for one hour and cooled, yielding 140.1 g. crude dimethylcarbamate of dimethylaminomethylphenol hydrochloride as a viscous amber oil, $n_D^{25}$ 1.5345. To 118 g. of this oil is added 0.6 g. sodium carbonate and 117.4 g. water to give a clear amber solution with a pH of 6.0 containing 50% of the crude hydrochloride and suitable for use in aphicidal concentrates.

Examples have been given of hydrochloride and of neutral and acid oxalate salts. Other salts, such as sulfates, phosphates, citrates, tartrates, sulfonates and the like may also be used, as well as the free bases. Moreover, it is not necessary to employ a pure salt, and the bases may be neutralized with acids to any desired pH without affecting the aphicidal action. The choice of pH will depend on how the composition is to be used. Thus, when solubility in organic solvents is desired or when used in conjunction with naturally alkaline substances, such as Bordeaux mixture, the free or only partially neutralized base will be preferred. When solubility in water is desired or when used in conjunction with other insecticides that are unstable under alkaline conditions, such as DDT or chlordane, neutral or slightly acid solutions or dispersions will be preferred.

For effective and economical control of aphids and mites by the compounds of the invention, a non-phytotoxic carrier substance is required. By non-phytotoxic carrier substance is meant a carrier substance that is substantially non-injurious to plants under conditions of use. The carrier substance may be a simple diluent or solvent, such as a dust or water. Preferably, however, the carrier substance will include other agents, such as wetting, emulsifying, spreading, penetrating and sticking agents, that assist in the effective presentation of the toxicant to the insect. Suitable compositions include dusts, wettable powders, emulsions, solutions and aerosols.

In general, it is preferable to prepare the aphicidal compositions in concentrated form containing from 5 to 95% of dialkylcarbamate of dialkylaminomethylphenols or their salts. These concentrates may then be diluted before use, the degree of dilution depending on the conditions of use. When the composition is to be sprayed as a liquid, such as a solution, emulsion or dispersion, concentrations of from 0.005 to 0.5% of the active ingredient will be preferred. When the composition is to be sprayed as a dust, higher concentrations of the order of 0.1 to 5% will be preferred. Even higher concentrations will be preferred in aerosols, since the small size of the particles produced assists the distribution of the active ingredient.

When the composition is to be applied in solution as a spray, a concentrate of the toxicant in water or a water-miscible solvent such as alcohol, acetone or dioxane, together with a surface active agent or other adjuvant may be prepared and diluted with water before use. For example, one pound of a polyethylene glycol phenylisooctyl ether wetting agent may be added to one gallon of a 40% solution of crude dimethylcarbamate of dimethylaminomethylphenol as the hydrochloride salt to form a concentrate that is diluted with 400 to 800 parts of water before use as a spray.

When the composition is to be sprayed as an emulsion, a concentrate of the toxicant in a solvent that is not miscible with water, such as xylene, kerosene, an alkylated naphthalene, or a petroleum oil, together with an emulsifier, may be prepared and dispersed in water before use. For example, a concentrate containing 20 parts crude dimethylcarbamate of dimethylaminomethylphenol and 5 parts of a polyethylene sorbitol oleate-laurate dispersing agent in 75 parts xylene may be prepared that is dispersed in 200 to 400 parts water before use.

When the composition is to be sprayed as dust, a concentrate of the toxicant with a dust, such as finely powdered talc, clay or diatomaceous earth may be prepared. Finely ground plant materials such as walnutshell, wheat, redwood, soyabean or cottonseed flours may also be used. Compounds of the invention in the solid state may be ground or mixed with the dust. Compounds that are liquids may be dissolved in a volatile solvent such as acetone or benzene to effect better mixing and the solvent allowed to evaporate after mixing with the dust. The concentrate may then be diluted with material of low bulk density, such as silica gel, hydrated alumina, calcium silicate, or diatomaceous earth, or with material of high bulk density, such as pyrophyllite, talc, calcite or a clay, or with mixtures of the two types before use. For example, 10 parts of crude dimethylcarbamate of dimethylaminomethylphenol in 10 parts acetone may be sprayed with good mixing onto 90 parts of finely ground talc. After evaporation of the acetone, the concentrate may be diluted with 5 or 10 parts talc or other dust diluent before use. Wetting agents may be added to the dusts so that they may be dispersed or suspended in water to give a liquid spray.

Surface active and emulsifying agents suitable for use in the foregoing compositions include anionic types, such as alkali and ammonium salts of fatty acids, alkyl sulfates, and alkyl and aryl sulfonic acids, nonionic types, such as esters of fatty acids with polyalcohols and alcohol polyethers, and cationic types, such as lauryl pyridinium chloride. Natural products such as casein and blood albumin may also be used.

For use in an aerosol, the toxicant may be dissolved in acetone or a mixture of acetone and a heavy petroleum oil and mixed in a thick-walled canister or bomb with a propellant such as methyl chloride or dichlorodifluoromethane.

The compounds of the invention may be employed in conjunction with other pesticides and with fungicides.

The compounds of the invention have a lower mammalian toxicity and a greater stability to hydrolysis than some of the commonly used aphicides.

I claim:

1. A pesticidal composition comprising a toxicant of the formula $$(R)_2NOCO—A—CH_2Y$$

wherein R is a methyl group, A is selected from the group consisting of phenyl, lower alkyl substituted phenyl, nitrophenyl and chlorophenyl, and Y is selected from the group consisting of dimethylamino, N-piperidino, N-morpholino and N-pyrrolidino, and a non-phytotoxic carrier substance.

2. A pesticidal composition as defined in claim 1 wherein the toxicant is in the form of the free base.

3. A pesticidal composition as defined in claim 1 wherein the toxicant is in the form of an acid salt.

4. A pesticidal composition comprising a dimethylcarbamate of a dimethylaminomethylphenol and a non-phytotoxic carrier substance.

5. A pesticidal composition comprising a dimethylcarbamate of a dimethylaminomethyl- lower alkylphenol and a non-phytotoxic carrier substance.

6. A method of combatting plant infestations of aphids and mites which comprises applying to the plants a composition containing at least about 0.003% of a toxicant of the formula $$(R)_2NOCO—A—CH_2Y$$

wherein R is a methyl group, A is selected from the group consisting of phenyl, lower alkyl substituted phenyl, nitrophenyl and chlorophenyl, and Y is selected from the group consisting of dimethylamino, N-piperidino, N-morpholino and N-pyrrolidino, and a non-phytotoxic carrier substance.

7. A method of combatting plant infestations of aphids and mites which comprises applying to the plants a composition containing at least about 0.003% of a dimethylcarbamate of a dimethylaminomethylphenol and a non-phytotoxic carrier substance.

8. A method of combatting plant infestations of aphids and mites which comprises applying to the plants a composition containing at least about 0.003% of a dimethylcarbamate of a dimethylaminomethyl- lower alkylphenol and a non-phytotoxic carrier substance.

9. A pesticidal composition comprising the hydrochloride of a dimethylcarbamate of a dimethylaminomethylphenol and a non-phytotoxic carrier substance.

10. A pesticidal composition comprising the dimethylcarbamate of 2-dimethylaminomethylphenol and a non-phytotoxic carrier substance.

11. A pesticidal composition comprising the dimethylcarbamate of 4-dimethylaminomethylphenol and a non-phytotoxic carrier substance.

12. A pesticidal composition comprising the dimethylcarbamate of 4-dimethylaminomethyl-2-methyl-5-isopropylphenol and a non-phytotoxic carrier substance.

13. A method of combatting plant infestations of aphids and mites which comprises applying to the plants a composition containing at least about 0.003% of the hydrochloride of a dimethylcarbamate of a dimethylaminomethylphenol and a non-phytotoxic carrier substance.

14. A method of combatting plant infestations of aphids and mites which comprises applying to the plants a composition containing at least about 0.003% of the dimethylcarbamate of 2-dimethylaminomethylphenol and a non-phytotoxic carrier substance.

15. A method of combatting plant infestations of aphids and mites which comprises applying to the plants a composition containing at least about 0.003% of the dimethylcarbamate of 4-dimethylaminomethylphenol and a non-phytotoxic carrier substance.

16. A method of combatting plant infestations of aphids and mites which comprises applying to the plants a composition containing at least about 0.003% of the dimethylcarbamate of 4-dimethylaminomethyl-2-methyl-5-isopropylphenol and a non-phytotoxic carrier substance.

References Cited in the file of this patent

UNITED STATES PATENTS

| | | |
|---|---|---|
| 1,905,990 | Aeschlimann | Apr. 25, 1933 |
| 2,209,245 | Bartholomaus | July 23, 1940 |
| 2,485,550 | Aeschlimann | Oct. 25, 1949 |
| 2,592,890 | Gysin | Apr. 15, 1952 |

OTHER REFERENCES

Brown: Insect Control by Chemicals, John Wiley and Sons, Inc., New York, N. Y. 1951, p 324.